(12) United States Patent
Loreth (10) Patent No.: US 6,398,852 B1
(45) Date of Patent: Jun. 4, 2002

(54) DEVICE FOR AIR CLEANING (75) Inventor: Andrzej Loreth, Akersberga (SE)

(73) Assignee: Eurus Airtech AB, Akersberga (SE)

( * ) Notice: Subject to any disclaimer, the term of this patent is extended or adjusted under 35 U.S.C. 154(b) by 0 days.

(21) Appl. No.: 09/367,858

(22) PCT Filed: Mar. 5, 1998

(86) PCT No.: PCT/SE98/00398

§ 371 (c)(1),
(2), (4) Date: Oct. 12, 1999

(87) PCT Pub. No.: WO98/39100

PCT Pub. Date: Sep. 11, 1998

(30) Foreign Application Priority Data

| Mar. 5, 1997 | (SE) | ................................................ 9700782 |
| Apr. 9, 1997 | (SE) | ................................................ 9701305 |

(51) Int. Cl.[7] ............................................. B03C 3/45
(52) U.S. Cl. ............................. 96/63; 55/498; 55/520; 96/69; 96/88; 96/98
(58) Field of Search ............................. 96/63, 98, 69, 96/60, 61, 94, 97, 88; 55/520, 498, 497

(56) References Cited

U.S. PATENT DOCUMENTS

| 977,335 | A | * | 11/1910 | Shaffner ........................ 96/63 |
| 3,841,840 | A | | 10/1974 | Hundhausen et al. ....... 96/58 X |
| 4,313,741 | A | | 2/1982 | Masuda et al. ............... 96/78 |
| 4,344,776 | A | * | 8/1982 | Yavnieli ........................ 96/63 |
| 5,529,613 | A | * | 6/1996 | Yavnieli ........................ 96/63 |
| 5,766,318 | A | * | 6/1998 | Loreth et al. ................ 96/69 |
| 5,779,769 | A | * | 7/1998 | Jiang ........................ 96/63 X |
| 5,980,614 | A | * | 11/1999 | Loreth et al. ................ 96/63 |
| 5,993,521 | A | * | 11/1999 | Loreth et al. ............ 96/98 X |
| 6,203,600 | B1 | * | 3/2001 | Loreth ..................... 96/94 X |

FOREIGN PATENT DOCUMENTS

| FR | 1400684 | 4/1965 |

* cited by examiner

*Primary Examiner*—Richard L. Chiesa
(74) *Attorney, Agent, or Firm*—Birch, Stewart, Kolasch & Birch, LLP

(57) ABSTRACT

The present invention is directed to a device (1;1';1"; 1'''; 1''''; 1''''') for air cleaning, especially from electrically charged particles, the device (1;1';1"; 1'''; 1''''; 1''''') including an air flow channel (2;2';2"; 2'''; 2''''; 2'''''), an air transporting mechanical fan (3;3';3"; 3'''; 3''''; 3'''''), a precipitator (4;4';4"; 4'''; 4''''; 4'''''), a high voltage source (5;5';5"; 5'''; 5''''; 5'''''), the precipitator (4;4';4"; 4'''; 4''''; 4''''') including two band-like electrode elements that are wound several times around an axis or bobbin body (7;7';7"; 7'''; 7''''; 7'''''), a gap distance being present between adjacent electrode elements, respective electrode elements being electrically connected with each terminal of the high voltage source (5;5';5"; 5'''; 5''''; 5'''''), characterized in that the precipitator (4;4';4"; 4'''; 4''''; 4''''') is arranged downstream of the fan (3;3';3"; 3'''; 3''''; 3''''').

12 Claims, 6 Drawing Sheets

DEVICE FOR AIR CLEANING

This application is a national stage application of International Application No. PCT/SE98/00398, filed Mar. 5, 1998.

PRIOR ART

Due to the increasing number of individuals having allergical/asthmatic problems the environment debate has been focused around the indoor environment, the central point being the quality of the indoor air. In connection with this focusing the use of so called freestanding air cleaners has increased simultaneously as their function has developed from providing isolated contributions to constituting a complement to an existing ventilation system. However, in order to achieve a complete acceptance as a complement to or part of ventilating measures these devices must fulfill high technical demands, they must be easy to handle and last but not least they must be adaptable to a certain indoor environment through their design and their choice of colour scheme.

In certain indoor environments, i.e. open-plane offices, individuals having a higher demand of clean air may face problems since it costwise, spacewise or from other reasons may be difficult to clean the air in the entire premises in question to fulfill the demands of said individuals.

The technical performance for air cleaners may briefly be summarised as the clean air generation of the device (CADR equivalent clean air generation ($m^3/h$) at extremely low noise level). By low noise level is in practice meant a noise level lower than 35 dbA and preferably lower than 30–31 dbA. The technical development described e.g. in SE-A-920515-6, PCT/SE95/00038, SE-A-9503096-1 and SE-A-9403369-3 has resulted in devices that fulfils the above mentioned required technical performance.

According to the description in the patent applications mentioned above the precipitator may be designed from high-ohmic, preferably cellulose-based material, e.g. paper. The precipitator of paper is of disposable type, i.e. it should be replaced by a new one when polluted. By this arrangement a possibility has been created to design precipitators having a large extension perpendicular to the direction of the air flow through the precipitator, said precipitator having a high capacity at exceptional low pressure drop. In SE-A-9602211-6 precipitators are described that may be manufactured with a suitable diameter of 40–50 cm. If precipitators of such dimensions would be manufactured in a traditional way, e.g. from sheet metal, they would in practice be unwieldy.

OBJECTS AND FEATURES OF THE INVENTION

A primary object of the present invention is to provide a device for air cleaning, a laminar flow being maintained in said device although the air is passing through the precipitator by the use of pressure.

A further object of the present invention is that the device should have extremely compact dimensions, especially as regards the extension of the device in the direction of the air flow.

Despite the extremely compact dimensions of the device a further object is to provide a clean air flow that in its turn creates a microclimate within a larger indoor area. In order to maintain a high separation degree as regards micro particles for the device according to the invention it is a further object that the air velocity through the precipitator should have as small differences as possible across the cross-section area of the precipitator.

A further object of the present invention is that the air flow through the precipitator, to as large extent as possible, should be laminar. Thereby the space around the user is flushed by a large volume of air having an air velocity below or near to 1 m/s, this being an air flow having a pleasant "breez" -feeling.

A further object of the present invention is that proper charging of the particles in the air flow should occur, said air volumes normally being larger than 200 $m^3/h$ and preferably larger than 500 $m^3/h$.

The objects of the invention is realised by a device that has been given the characteristics of the appending claims. Preferred embodiments of the invention are defined in the dependent claims.

BRIEF DESCRIPTION OF THE DRAWINGS

Below a number of embodiments of the invention will be described, reference being made to the accompanying drawings, where.

DETAILED DESCRIPTION OF THE EMBODIMENTS ACCORDING TO THE INVENTION

Figure 1:
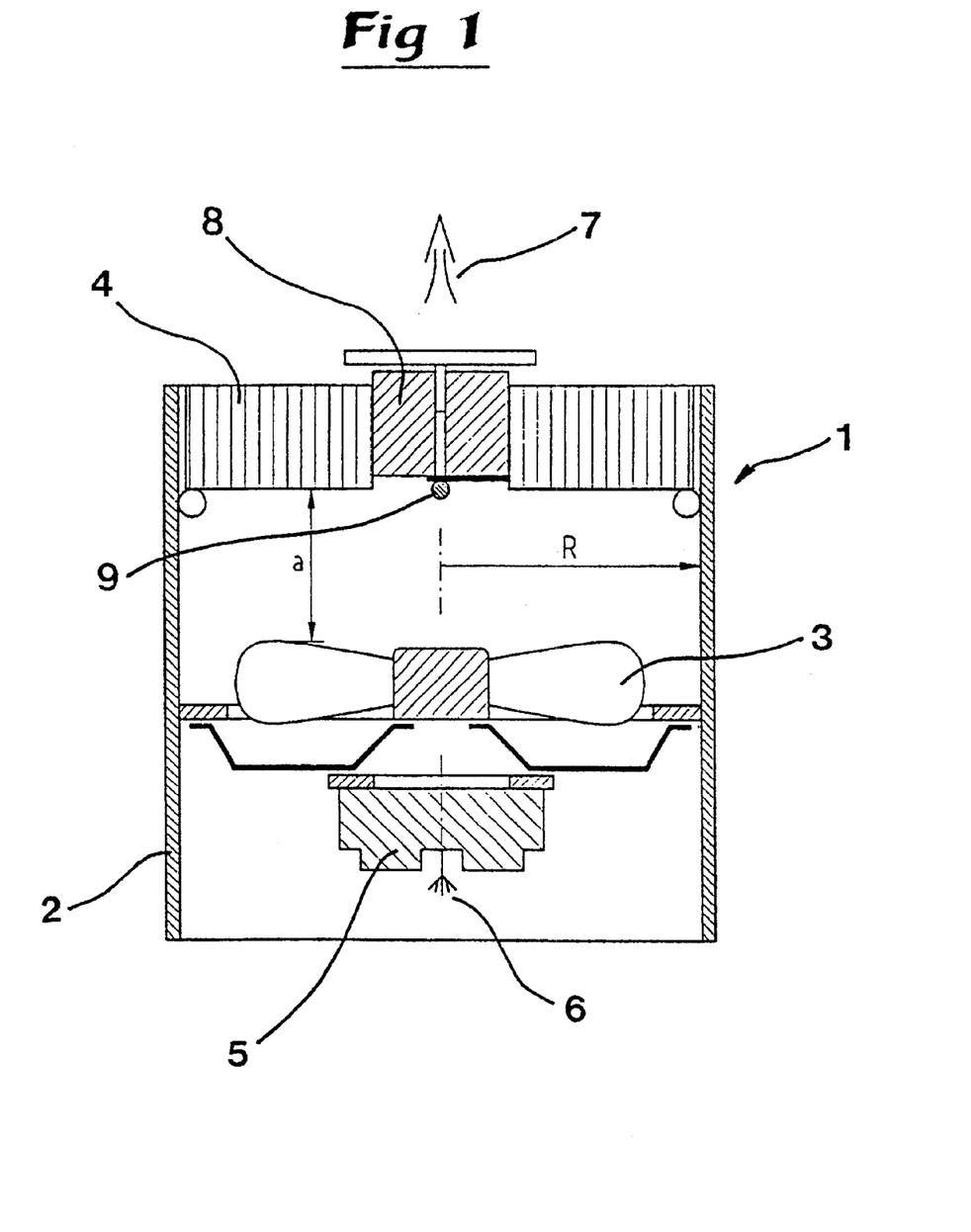
FIG. 1 shows a schematic cross-section through a first embodiment of the device according to the present invention.

The device 1 shown in FIG. 1 includes a tubular air flow channel 2 having a radius R, an air transporting fan 3, a precipitator 4, a high voltage source 5 and an ionisation electrode 6.

The precipitator 4 is designed in accordance with SE-A-9602211-6, said document being included in this application by way of reference. Thus the precipitator 4 includes two electrode elements in the shape of band-like strips that are wound around a bobbin body and electrically connected with a respective terminal of the high voltage source 5 in the air flow channel 2, said channel 2 having a similar cross section as the precipitator 4. As is apparent from FIG. 1, see the arrow 7 for the air flow direction, the precipitator 4 is arranged downstream the fan 3 in the air flow channel 2.

The precipitator 4 according to SE-A-9602211-6is manufactured from at least two band-like strips, preferably of paper or other high-ohmic (antistatic) material, said strips being wound around a bobbin body 8, see FIG. 1, said winding being effected in cooperation with spacers in the shape of soft, resilient bands (mounting bands) having a thickness corresponding to the wanted gap width between adjacent electrode elements in the finished precipitator 4. The winding may be terminated by having one of the band electrodes continuing some turns further compared to the other band electrode, said one band electrode constituting a casing of the precipitator 4. Before the mounting bands are removed fixing of the electrode elements is effected by the aid of hot melt adhesive or another suitable adhesive or moulding compound that is applied in the shape of strings that extend radially outward from the bobbin body 8. Preferably said strings may penetrate to some extent into the gap between adjacent parts of the electrode elements in order to increase the mechanical stability of the precipitator 4.

When the mounting bands have been removed the body of the precipitator 4, i.e. its visible edges of the respective electrode elements, may be fixed also at the other side of the precipitator in a corresponding way as for the first side, see above. However, it is preferable for the conductive function that the fixing of the electrode elements take place only at one side of the precipitator 4.

Due to the length of the electrode elements (several meters) and their high-ohmic (antistatic) properties it is convenient to arrange for wiring to secure voltage connection over the entire width of the bands of the electrode elements, this being made by application of conductive paint upon one longitudinal edge of the electrode elements. During winding said wirings should be located in such a way that they end up on both sides of the body of the precipitator.

The precipitator 4 according to FIG. 1 has a high voltage connection 9 that connects one group of electrode elements to the high voltage source 5.

The present invention is based upon observations made in 5 connection with laboratory tests of a device according to FIG. 1. It has surprisingly turned out that despite the fact that the distance a, between the fan 3 and the precipitator 4, is within the interval 0,5R<a<4R the air flow velocity through the precipitator 4 is essentially constant for the same radial distance from the middle of the precipitator 4. It is thus extremely surprising that also for such a small axial distance as 0,5R there exist acceptable flow conditions through the precipitator 4. The explanation of this is to be seen in the air flow profile of the air that exits the fan wheel of the axial fan 3 in combination with the round cross section of the air flow channel and the design of the precipitator 4. An air flow measurement over the discharge plane of the precipitator 4 clearly shows that the air flow travels through the device in the shape of a vortex. Said vortex passes almost freely through the helical air gap (is generated by the electrode elements being wound around a bobbin body), seen perpendicular to the symmetry axis of the device, said air gap following the profile of the air vortex. This is an important characterising feature of the present invention.

It is realised that at a sufficient large radial distance a between the air transporting fan 3 and the precipitator 4 acceptable air flow conditions may be achieved regardless of which type of fan 3 that is used. However, in practice, using a precipitator 4 according to SE-A-9602211-6, the largest axial distance a=4R and preferably the largest axial distance a=2R. In this connection it should be pointed out that the precipitator 4 according to SE-A-9602211-6 is a prerequisite for the device according to the present invention, and thus such a precipitator is also included in all embodiments of the invention described below.

The device according to FIG. 1 also includes an ionisation electrode 6, that in a way not shown in detail is connected with one terminal of the high voltage source 5. In the embodiment according to FIG. 1 the ionisation electrode 6 is provided outside the air flow channel 2, in connection with its mouth, in such a way that the ions may migrate in the space where the device for cleaning air according to the invention is located. It is of course also possible, if not especially practical, that the ionisation, i.e. the charging of the particles, is arranged by the aid of an external ionizer, said ionizer being not electrically connected with the device for cleaning air.

For devices suitable for table or shelf location the axial distance a should have as small a value as possible and in practice a should be of the same magnitude as R to make such a device acceptable.

Nor the location of the precipitator 4 according to FIG. 1 does reduce the total air flow through the device, which would be the case for precipitators having the same cross section, although with square or rectangular inlet area between the electrode elements, and otherwise similar conditions.

With the precipitator 4 arranged in accordance with the present invention, i.e. closest to the outlet from the device, an important functional parameter is also achieved. The air flow, free of particles, exits rapidly the device in a path almost straight as an arrow and travels rapidly far away from the inlet of said device. When the outlet plane of the precipitator 4 is located horizontally a very high so called ventilating efficiency is achieved without the risk for draught in the space where the device is located. This is especially important for devices of high air cleaning capacity.

Figure 2:
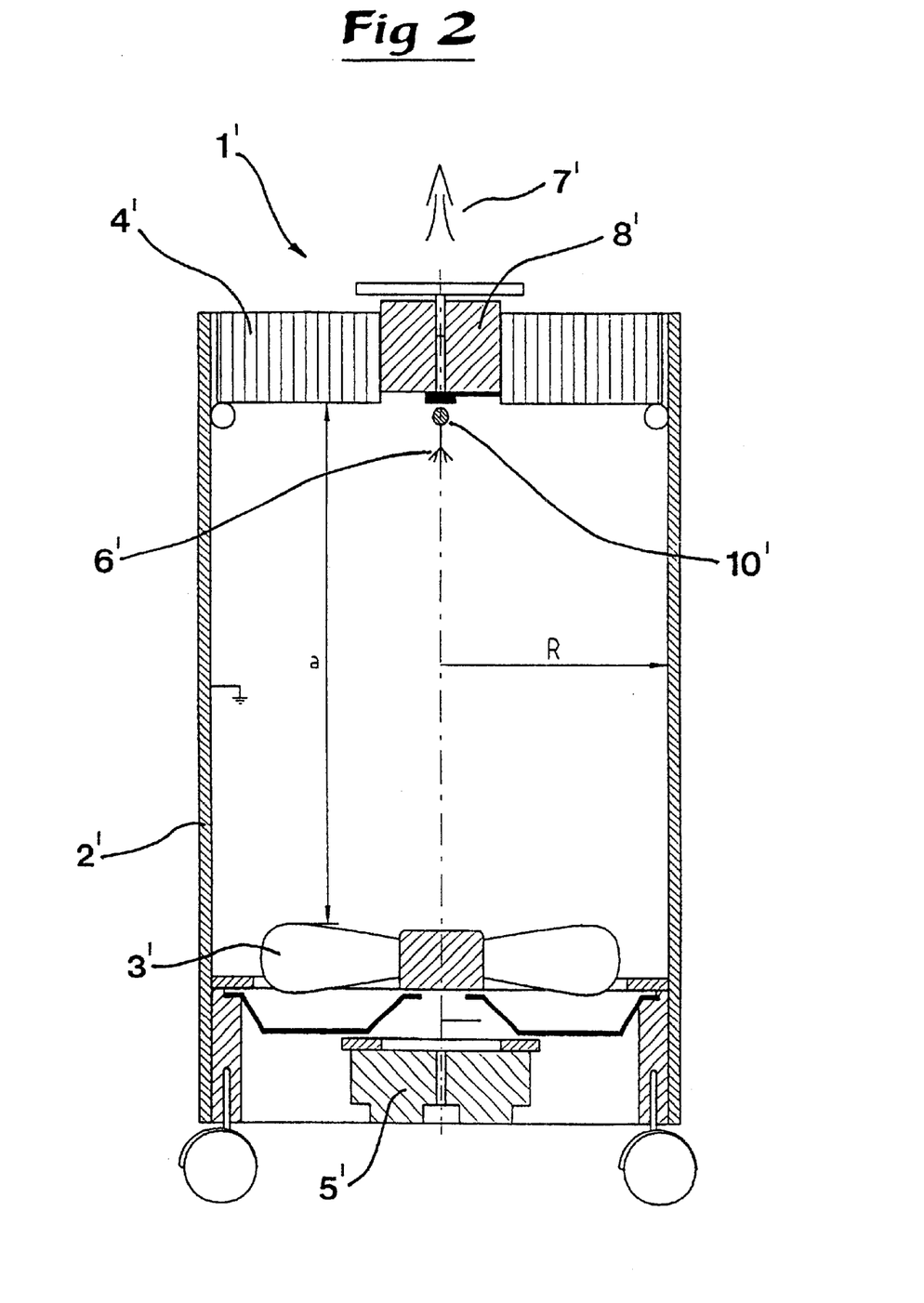
FIG. 2 shows a schematic cross-section through a second embodiment of the device according to the present invention.

The embodiment of the device 1' disclosed in FIG. 2 is a further development of the invention. The charging of the particles is arranged in the part of the air flow channel 2' that extends between the fan 3' and the precipitator 4'. According to FIG. 2 a small coal fibre brush 6' is used as ionisation electrode, said coal fibre brush 6' being arranged to essentially coincide with the symmetry axis of the air flow channel 21. The ionisation electrode 6' is electrically connected with one terminal of the high voltage source 5' while the inner wall of the air flow channel 2', at least in the space between the fan 3' and up to the precipitator 4', is electrically connected with the other terminal of the high voltage source 5' and preferably grounded. A prerequisite for such an arrangement is of course that the inner wall of the air flow channel constitutes of conducting, semi-conductive or antistatic material or with a coating of a corresponding material.

The precipitator 4' is electrically connected with the high voltage source 5' in such a way that one of the electrode elements, said element being grounded, touches the grounded inner surface of the air flow channel 2' and the other electrode is electrically connected via a contact, provided in the middle of the precipitator 4' and an electrical contact in a holder 10'. Within the scope of the invention so called passive charging of the precipitator 4' is also conceivable, said ionisation electrode 6' (the brush) being connected with one of the terminals of the high voltage source 5', preferably the negative terminal. The ion cloud generated around the ionisation electrode 6' charges one group of electrode elements of the precipitator 4' while the other group is connected with the ground.

It is of course conceivable to charge particles in another known way and by another type of corona electrode, however the way disclosed in FIG. 1 and 2 is preferred.

It is also possible, within the scope of the invention, that the devices 1;1' are mounted on the wall, in such a case the inlet side for the air is oriented towards the wall and the air flow channels 2;2' are directed obliquely upwards. As regards wall mounted units it is obvious that these should be as compact as possible in axial direction, i.e. in direction of the air flow.

Figure 3:
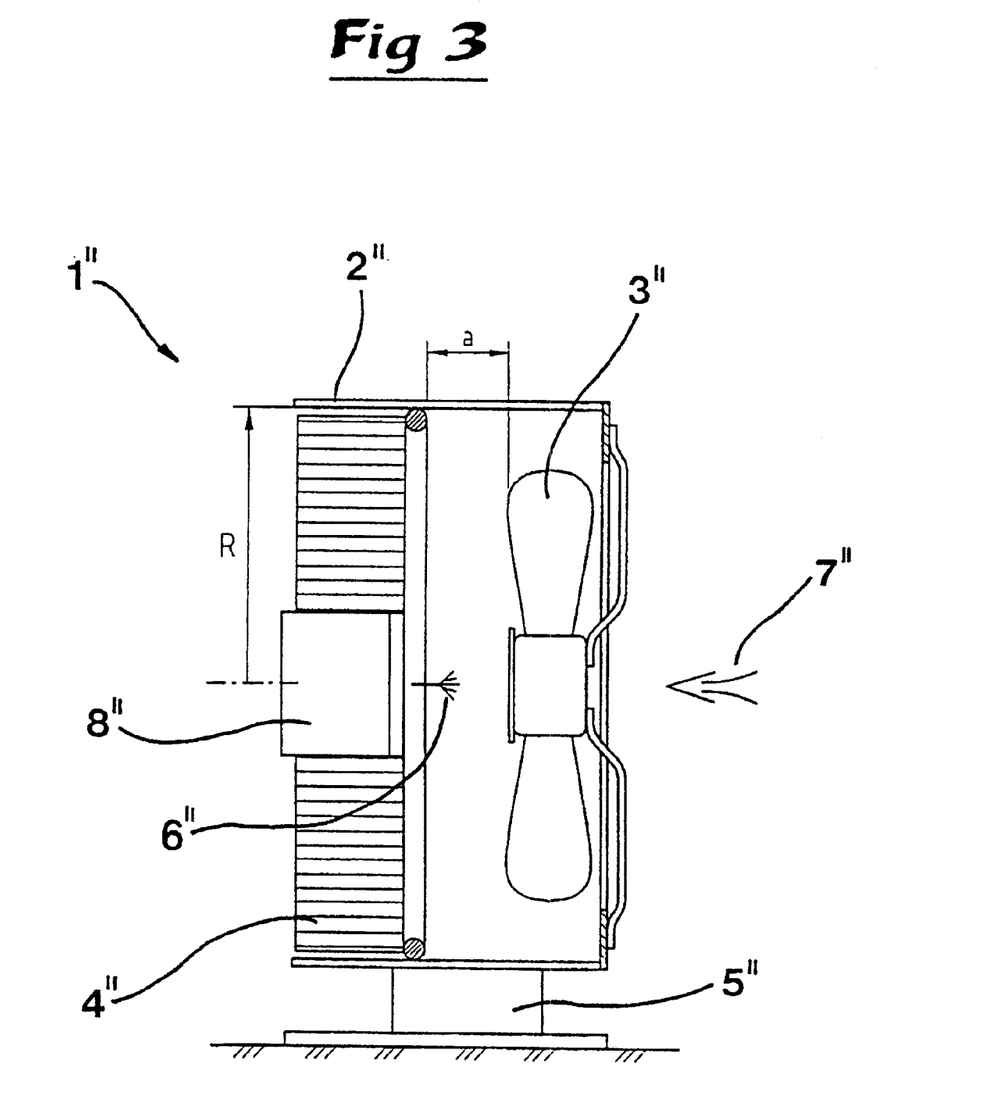
FIG. 3 shows a partly sectioned, schematic side view of a third embodiment of the device according to the present invention.

The device 1" according to the invention and disclosed in FIG. 3 includes a tubular air flow channel 2" having a radius R, an air transporting fan 3", a precipitator 4" having a respective electrode element or group of such elements in a suitable way connected with the respective terminal of the high voltage source 5", said source 5" in the disclosed embodiment being located outside the air flow channel 2". The precipitator 4" is provided at an axial distance a from the fan 3", said axial distance a in practice being 2–3 cm larger than the axial distance between the ionisation electrode 6" and the fan motor. The axial distance is smaller than the radius R of the air flow channel 2" and preferably a is smaller than ½–1/3 R. The device according to FIG. 3 also includes a small coal fibre brush arranged axially adjacent to the bobbin body 8" of the precipitator 4" and in a direction towards the fan 3". The ionisation electrode 6" is connected with the other terminal of the high voltage source 5" in a way not described in detail. The inner surface of the air flow channel 2" or a coating provided close to said inner surface constitutes of conducting, semi-conductive material and acts as a target electrode that receives charged ions, said target electrode preferably being electrically grounded. The ionisation electrode 6" may also be designed in a previously known way.

Figure 4:
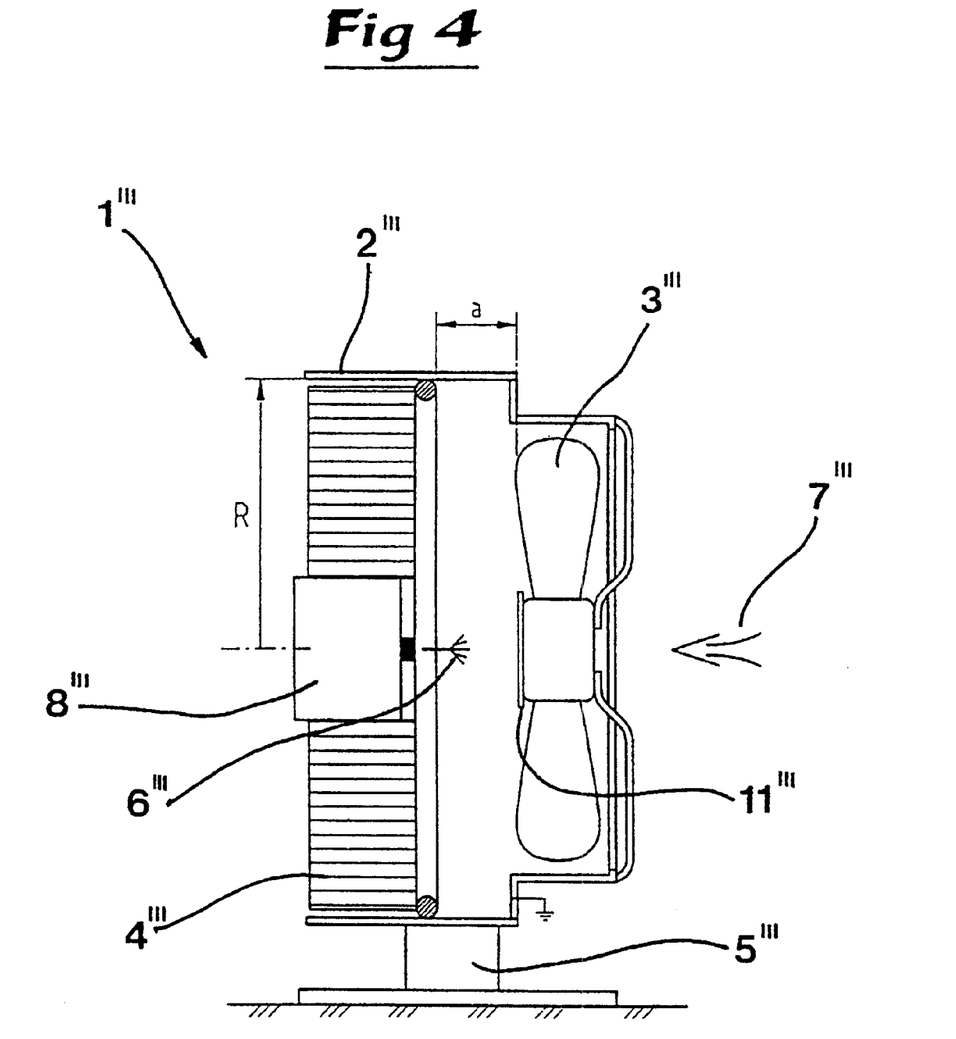
FIG. 4 shows a partly sectioned, schematic side view of a fourth embodiment of the device according to the present invention.

FIG. 4 shows a further embodiment of the device according to the present invention where the air flow channel 2''' widens seen from the inlet side, see the air flow direction 7''', beyond the fan 3''' and towards the precipitator 4''', said precipitator 4''' and the widened part of the air flow channel 2''' having a radius R. The widening of the air flow channel 2''' may be designed stepwise, as in FIG. 4, but also in another way, e.g. by means of a conical surface or the like. Such widening from smaller to larger cross-section area is not only due to making the device as compact as possible but such a design also brings the target electrode closer to the ionisation electrode 6''', this facilitates the generation of ions around said electrode 6'''.

Figure 5:
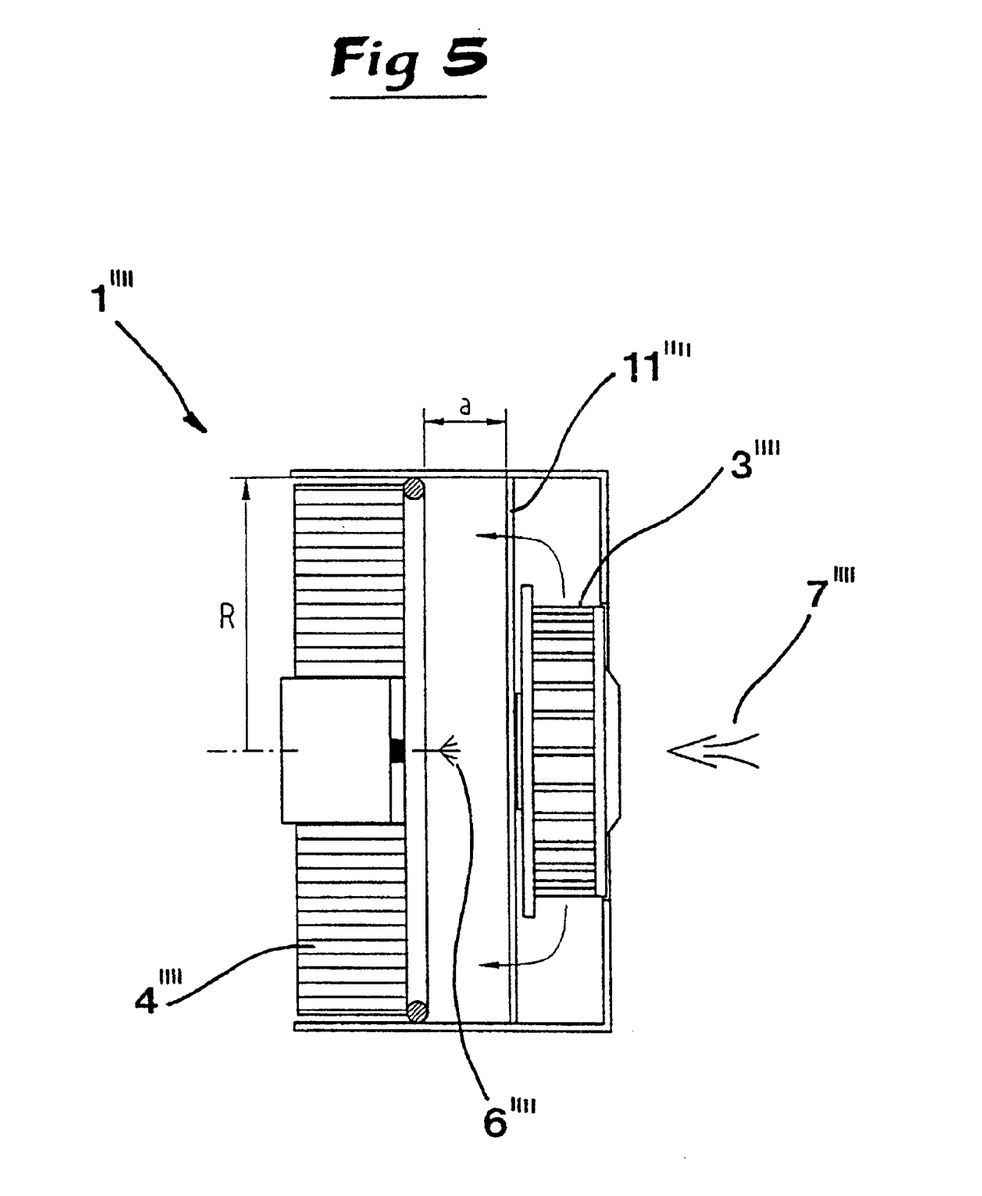
FIG. 5 shows a partly sectioned, schematic side view of a fifth embodiment of the device according to the present invention.

FIG. 5 shows an embodiment of the device 1'''' according to the invention that is suitable to be used to clean the air in for instance a car coupe. As is apparent from FIG. 5 a fan 3'''' of the type shown in said figure may be more convenient to use than an axial fan, however both types fulfill the requirements of the air flow profile through the precipitator 4''''. The fan 3'''' of the embodiment according to FIG. 5 is shielded from receiving charged ions by placement of an electrically insulating disc 11'''', said disc 11'''', may preferably constitute a part of the motor bracket. The distance of the ionisation electrode 6'''' to the insulating disc 11'''' is only a few cm, which is to be compared to the smallest radial distance, in practice, of 10–20 cm for the air flow channel 2''''. A necessary prerequisite for the function of the device is that the electrically conducting, semi-conductive or antistatic material that is provided closest below the insulating disc 11'''', e.g. the fan 3'''', should be electrically connected with essentially the same polarity as the target electrode of the ionisation chamber or to voltage having reverse polarity compared to the ionisation electrode. Otherwise the phenomena mentioned above will prevent the generation of ions around the ionisation electrode and thus the charging of particles in the through flowing air flow. In many environments the air is also polluted by various gaseous pollutions, e.g. from the motor traffic. The device according to the invention is suitable for removing various such pollutions. To this end the precipitator 4'''' is designed in such a way that one of the electrode elements, or both, are designed from or coated with an active gas absorbent of the type activated carbon.

By given dimensions of the depth of the precipitator and the fan, measured in the air flow direction through the device, it is the depth of the ionisation chamber, i.e. when said chamber constitutes the space between the precipitator and the fan, that ultimately defines the total extension of the device in the air flow direction. It is known for instance from the ion wind technique that also surfaces that are permeable to the air flow and consist of insulating material may disturb or completely prevent the ionisation electrode to emit ions if said surfaces are located adjacent the ionisation electrode. This is essentially independent of the voltage of the ionisation electrode in relation to the target electrode of the ionisation chamber, i.e. the electrode that receives ions. The phenomena is not scientifically surveyed. From this background it has surprisingly turned out that rotating fan blades of insulating material, e.g. plastic, does not prevent the flow of ions to reach the target electrode (the inner surface of the air flow channel) in the way described above. The target electrode of the air flow channel may constitute the inner surface of the air flow channel or a coating provided upon said surface of electrically conductive or semiconductive material, said target electrode being connected with the other terminal of the high voltage source and preferably grounded.

Figure 6:
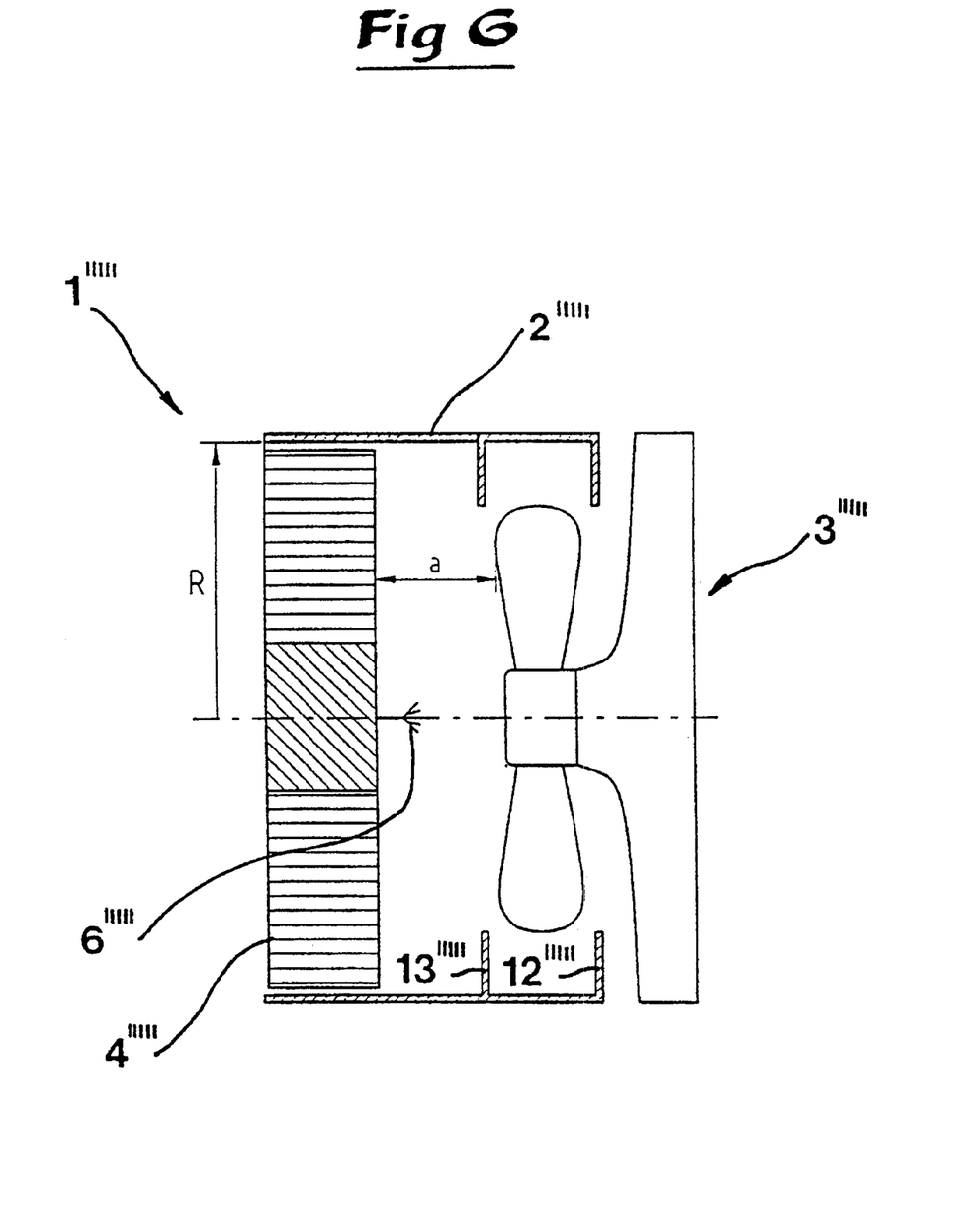
FIG. 6 shows a partly sectioned, schematic side view of a sixth embodiment of the device according to the present invention.

The embodiment disclosed in FIG. 6 includes a precipitator 4''''' that is received at one end of an air flow channel 2'''''. At the other end of the air flow channel 2''''' a fan 3''''' is mounted, said fan blade being located between partitions 12''''' and 13''''' extending a certain distance into the air flow channel 2''''' and terminating in radial direction at the level of the circular arc that the ends of the fan blade generate upon rotation of the fan blade. The partitions 12''''' and 13''''' thus each define a circular opening having a diameter that essentially corresponds to the diameter of the circular arc generated by the ends of the fan blade. The fan 3''''' may be defined as a free blowing fan since it is not located in a well defined air flow channel. A free blowing fan displaces considerable volumes of air in a rather undefined way, i.e. the fan is spinning in the air. If a partition 12''''' and a partition 13''''' with their respective openings are located adjacent to the fan blade, as in accordance with the device shown in FIG. 6, it has turned out in empiric way that well defined air flow conditions have been created downstream the partition 13'''''. The fan 3''''' generates an air coil that without disturbing noise level is transported from the fan 3''''' to the precipitator 4''''', said air coil then bypassing the precipitator 4''''' with its helical passages. That the air flow pattern harmonises with the passages in the precipitator 4''''' is beneficial since the air flow then is disturbed only to a minor degree.

In this connection it should be pointed out that the geometrical cross-sectional shape of the air flow channel 2-2''''' thus can vary without any influence worth mention upon the efficiency of the device when the air flow travels helically independently of the cross-sectional shape of the air flow channel 2-2'''''. In exemplifying but not restricting purpose it could be mentioned that the cross section of the air flow channel may be circular cylindrical, oval, square or rectangular. For this reason the expression "the smallest radial distance" is used in the claims since the air flow channel does not need to have circular cross-sectional shape. In the claims it is further defined that the radius R of the air flow channel 2; 2'; 2"; 2'''; 2''''; 2''''' or the smallest radial distance from the centre of the precipitator 4; 4'; 4"; 4'''; 4''''; 4''''' to the envelope surface of the air flow channel 2; 2'; 2";

2'''; 2''''; 2''''' is measured in connection with the precipitator 4; 4'; 4''; 4'''; 4''''; 4''''', i.e. at the level of the precipitator 4; 4'; 4''; 4'''; 4''''; 4''''' where the precipitator 4; 4'; 4''; 4'''; 4''''; 4''''' and the air flow channel 2; 2'; 2''; 2'''; 2''''; 2''''' have a common cross-sectional shape.

For all embodiments defined above the diameter of the fan 3-3'''' is larger than the radius R of the precipitator 4-4''''. Preferably the diameter of the fan 3-3'''' is larger than 1,2 R.

What is claimed is:

1. Device (1; 1'; 1''; 1'''; 1''''; 1''''') for air cleaning, said device (1; 1'; 1''; 1'''; 1''''; 1''''') including an air flow channel (2; 2'; 2''; 2'''; 2''''; 2''''';), an air transporting mechanical fan (3; 3'; 3''; 3'''; 3''''; 3'''''), a precipitator (4; 4'; 4''; 4'''; 4''''; 4'''''), a high voltage source (5; 5'; 5''; 5'''; 5''''; 5'''''), said precipitator (4; 4'; 4''; 4'''; 4''''; 4''''') including two band-shaped electrode elements that are wound several times around an axis or bobbin body (7; 7'; 7''; 7'''; 7''''; 7'''''), a gap distance being present between adjacent electrode elements, the respective electrode elements being electrically connected with each terminal of the high voltage source (5; 5'; 5''; 5'''; 5''''; 5'''''), and the precipitator (4; 4'; 4''; 4'''; 4''''; 4''''') is arranged downstream from the fan (3; 3'; 3''; 3'''; 3''''; 3'''''), characterized in that the axial distance (a), seen in the air flow direction, between the fan (3; 3'; 3''; 3'''; 3''''; 3''''') and the precipitator (4; 4'; 4''; 4'''; 4''''; 4''''') is less than 4R, where R is equal to the radius of the air flow channel (2; 2'; 2''; 2'''; 2''''; 2''''') or the smallest radial distance from the centre of the precipitator (4; 4'; 4''; 4'''; 4''''; 4''''') to the envelope source of the air flow channel (2; 2'; 2''; 2'''; 2''''; 2'''''), said radius or said smallest radial distance being measured in connection with the precipitator (4; 4'; 4''; 4'''; 4''''; 4''''').

2. Device according to claim 1, characterized in that the axial distance (a), seen in the air flow direction, between the fan (3; 3'; 3''; 3'''; 3''''; 3''''') and the precipitator (4; 4'; 4''; 4'''; 4''''; 4''''') is less than 2R, where R is equal to the radius of the air flow channel (2; 2'; 2''; 2'''; 2''''; 2''''') or the smallest radial distance from the centre of the precipitator (4; 4'; 4''; 4'''; 4''''; 4''''') to the envelope surface of the air flow channel (2; 2'; 2''; 2'''; 2''''; 2'''''), said radius or said smallest radial distance being measured in connection with the precipitator (4; 4'; 4''; 4'''; 4''''; 4''''').

3. Device according to claim 1, characterized in that the axial distance (a), seen in the air flow direction, between the fan (3; 3'; 3''; 3'''; 3''''; 3''''') and the precipitator (4; 4'; 4''; 4'''; 4''''; 4''''') is less than R, where R is equal to the radius of the air flow channel (2; 2'; 2''; 2'''; 2''''; 2''''') or the smallest radial distance from the centre of the precipitator (4; 4'; 4''; 4'''; 4''''; 4''''') to the envelope surface of the air flow channel (2; 2'; 2''; 2 '''; 2''''; 2'''''), said radius or said smallest radial distance being measured in connection with the precipitator (4; 4'; 4''; 4'''; 4''''; 4''''').

4. Device according to claim 3, characterized in that the diameter of the fan (3; 3'; 3''; 3'''; 3''''; 3''''') is larger than R, said R being the radius or half of the transverse dimension of the air flow channel (2; 2'; 2''; 2'''; 2''''; 2''''') measured in connection with the precipitator (4; 4'; 4''; 4'''; 4''''; 4''''').

5. Device according to claim 1, characterized in that an ionisation chamber is arranged in the air flow channel (2; 2'; 2''; 2'''; 2''''; 2''''') between the fan (3; 3'; 3''; 3'''; 3''''; 3''''') and the precipitator (4; 4'; 4''; 4'''; 4''''; 4'''''), said ionisation chamber having an ionisation electrode (6; 6'; 6''; 6'''; 6''''; 6''''').

6. Device according to claim 5, characterized in that the inner wall of the air flow channel (2; 2'; 2''; 2'''; 2''''; 2''''') is coated with conducting/semi-conductive/antistatic material, said material optionally being grounded and constituting target electrode of the ionisation electrode (6; 6'; 6''; 6'''; 6''''; 6''''').

7. Device according to claim 6, characterized in that between the fan (3'''; 3'''') and the ionisation electrode (6'''; 6'''') an electrically insulating material (11'''; 11'''') is provided.

8. Device according to claim 5, characterized in that the ionisation electrode (6; 6'; 6''; 6'''; 6''''; 6''''') is in the shape of a coal fibre brush.

9. Device according to claim 8, characterized in that between the fan (3'''; 3'''') and the ionisation electrode (6'''; 6'''') an electrically insulating material (11'''; 11'''') is provided.

10. Device according to claim 5, characterized in that between the fan (3'''; 3'''') and the ionisation electrode (6'''; 6'''') an electrically insulating material (11'''; 11'''') is provided.

11. Device according to claim 5, characterized in that the diameter of the fan (3; 3'; 3''; 3'''; 3''''; 3''''') is larger than R, said R being the radius or half of the transverse dimension of the air flow channel (2; 2'; 2''; 2'''; 2''''; 2''''') measured in connection with the precipitator (4; 4'; 4''; 4'''; 4''''; 4''''').

12. Device according to claim 1, characterized in that the diameter of the fan (3; 3'; 3''; 3'''; 3''''; 3''''') is larger than R, said R being the radius or half the transverse dimension of the air flow channel (2; 2'; 2''; 2'''; 2''''; 2''''') measured in connection with the precipitator (4; 4'; 4''; 4'''; 4''''; 4''''').

* * * * *